(12) United States Patent
Nordlund et al.

(10) Patent No.: US 8,087,381 B2
(45) Date of Patent: Jan. 3, 2012

(54) METHOD FOR OPTIMIZING HEALTH AND PRODUCTIVITY OF MILK PRODUCING ANIMALS (75) Inventors: Kenneth V. Nordlund, Madison, WI (US); Thomas B. Bennett, Madison, WI (US); Garrett A. Oetzel, Middleton, WI (US); Murray K. Clayton, Middleton, WI (US); Nigel B. Cook, Waunakee, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 13/025,817

(22) Filed: Feb. 11, 2011

(65) Prior Publication Data
US 2011/0137630 A1 Jun. 9, 2011

Related U.S. Application Data (63) Continuation of application No. 11/278,114, filed on Mar. 30, 2006, now Pat. No. 7,886,691.

(60) Provisional application No. 60/716,781, filed on Sep. 13, 2005, provisional application No. 60/755,277, filed on Dec. 29, 2005.

(51) Int. Cl.
*A01J 3/00* (2006.01)
*A01J 5/00* (2006.01)

(52) U.S. Cl. ................................. 119/14.01; 119/14.02
(58) Field of Classification Search ............... 119/14.01, 119/14.02
See application file for complete search history.

(56) References Cited

U.S. PATENT DOCUMENTS

| | | | | |
|---|---|---|---|---|
| 5,959,526 A | * | 9/1999 | Tucker | 340/572.1 |
| 6,814,025 B2 | * | 11/2004 | Chen et al. | 119/14.01 |
| 7,886,691 B2 | * | 2/2011 | Nordlund et al. | 119/14.01 |
| 2005/0126500 A1 | * | 6/2005 | Burghardi et al. | 119/51.01 |
| 2006/0257372 A1 | * | 11/2006 | Horn et al. | 424/93.4 |
| 2006/0271302 A1 | * | 11/2006 | Ehrlich | 702/19 |
| 2007/0191483 A1 | * | 8/2007 | Bauman et al. | 514/560 |

* cited by examiner

*Primary Examiner* — Rob Swaitek
*Assistant Examiner* — Valentina Xavier
(74) *Attorney, Agent, or Firm* — Quarles & Brady LLP (57) ABSTRACT A method is disclosed for calculating a transition monitor value for one or more milk-producing animals so as to enable its use in evaluating and optimally managing the health and productivity (i.e., the transition performance) of those individual animals and of their herds. An expected milk production is calculated for a given time period of a current lactation based both on the individual's performance in her previous lactation and on her current state. Transition monitor values are calculated as the difference between actual and expected milk production values. The transition monitor values can then be used to evaluate and to optimize the health and productivity of both individuals and herds of individuals and to make comparisons of transition monitor programs both within and between herds.

15 Claims, 2 Drawing Sheets

METHOD FOR OPTIMIZING HEALTH AND PRODUCTIVITY OF MILK PRODUCING ANIMALS

CROSS REFERENCES

This application is entitled to the benefit of U.S. Provisional Patent Application Ser. No. 60/716,781, filed 2005 Sep. 13, and of U.S. Provisional Patent Application Ser. No. 60/755,277, filed 2005 Dec. 29, and is a continuation of U.S. patent application Ser. No. 11/278,114, filed 2006 Mar. 30 now U.S. Pat. No. 7,886,691, which is hereby incorporated by reference in its entirety.

STATEMENT REGARDING FEDERALLY SPONSORED RESEARCH OR DEVELOPMENT

Not applicable.

BACKGROUND

In herds of milk-producing animals such as dairy cows, the management of individuals during the transition period between lactations is very important. This is because the transition performance of an individual animal is highly influenced by health and/or disease, both of which can, in turn, be affected by management practices. The better the transition performance of an individual, the greater her overall health and productivity in the current lactation. Monitoring the transition performance of milk-producing animals is therefore of great importance to informing transition program management practices. A review of these basic concepts can be found in Kenneth V. Nordlund and Nigel B. Cook, Using herd records to monitor transition cow survival, productivity, and health (Vet. Clin. Food Anim. 20: 627-649, November 2004) hereinafter incorporated by reference in its entirety.

Currently available methods for evaluating transition performance fail to provide unbiased and objective measures of transition performance for individual animals. The ability to monitor change and to evaluate the success of innovations at a farm level remains relatively crude. Herd managers implement new transition management practices and evaluate the response within their herd using a variety of factors. Many dairies have health records to allow them to track changes in the number of disease events on their own dairy, but inconsistencies in case definition make it difficult to compare disease rates both within and between farms. Milk production monitors in early lactation are often based upon average performance of the animals that calve in a short period of time. These are easily skewed by a small number of either better or poorer animals that freshen a month earlier or later. Herd effects therefore confound the results. Other production monitors based upon first test date information are frequently confounded by variations in days in milk at first test date.

For the foregoing reasons there is a need for a method which objectively and accurately predicts an individual milk-producing animal's current milk performance based on objective measures of her own past performance and current state, and which monitors the transition programs of individuals and herds so that the health and productivity of both individuals and herds of individuals may be optimized through informed transition programs.

SUMMARY

The present invention is directed to a method that satisfies these needs by providing means for accurately predicting, based on objective measures of her own individual previous lactation's performance and current state, an individual milk-producing animal's expected current milk performance, particularly during the early phase of the current lactation, or transition period, which is highly influenced by health and/or disease. The present invention further provides a method for utilizing this prediction to calculate a monitor of transition performance of individuals and herds during the early phase of current lactations for use in analyzing transition programs in order to better manage both individuals and herds for optimal health and productivity.

In one version, a method of using a computer for calculating a transition monitor value for one or more milk-producing animals at a given time period in a current lactation (TM_ind, time) so as to enable its use in evaluating and optimally managing the health and productivity of the one or more milk-producing animals, is disclosed. The steps generally consist of accessibly storing an animal data set comprising, for each of the one or more milk-producing animals, an amount of milk produced in the individual's previous lactation (MP_actual,305,previous), a current number of days in milk at a test day (CDIM), and an actual amount of milk produced by the individual in a current lactation for the given time period (MP_actual,time); accessibly storing a parameters data set comprising $\alpha$, a regression coefficient intercept, and regression coefficients $\beta$ associated with MP_actual,305, previous, and $\epsilon$ associated with CDIM; for each of said one or more individual milk-producing animals, calculating an expected amount of milk produced by the individual in the current lactation for the given timeperiod (MP_expected, time) by summing $\alpha$, ($\beta$*MP_actual,305,previous) and ($\epsilon$*CDIM); for each of said one or more individual milk-producing animals, calculating the transition monitor value (TM_ind,time) by subtracting the individual's MP_expected, time from her MP_actual,time; accessibly storing the transition monitor value for each of said one or more milk-producing animals; and, outputting said transition monitor values for use in evaluating and optimizing health and productivity of the one or more milk-producing animals; whereby a method is provided for calculating the expected amount of milk produced by an individual milk-producing animal in its current lactation based on the individual's actual performance in its previous lactation and on its current state for use in calculating a transition monitor value indicative of the individual's transition performance and usable for evaluating and optimizing the individual's health and productivity.

In another version, a herd-level transition monitor value is further calculated as an average over all individuals in a herd.

In still another version, a sire-specific transition monitor value is calculated by averaging transition monitor values for all daughters of a sire.

In still other versions, additional components are added to further refine the model.

In still other versions of the present invention an apparatus, computer program product, and program storage device for performing the method of the present invention are disclosed.

The reader is advised that this summary is not meant to be exhaustive. Further features, aspects, and advantages of the present invention will become better understood with reference to the following description, accompanying drawings and appended claims.

BRIEF DESCRIPTION OF THE DRAWINGS

For a better understanding of the present invention, reference may be made to the accompanying drawings, in which.

DESCRIPTION

Referring now specifically to the figures, in which identical or similar steps or parts are designated by the same reference numerals throughout, a detailed description of the present invention is given. It should be understood that the following detailed description relates to the best presently known embodiment of the invention. However, the present invention can assume numerous other embodiments, as will become apparent to those skilled in the art, without departing from the appended claims.

It should also be understood that, while the methods disclosed herein may be described and shown with reference to particular steps taken in a particular order, these steps may be combined, sub-divided, or re-ordered to form an equivalent method without departing from the teachings of the present invention. Accordingly, unless specifically indicated herein, the order and grouping of the steps is not a limitation of the present invention.

It should also be understood that, though the following description discloses the invention as adapted for use with dairy cows particularly, the method may be applied to females of other types of milk-producing animals as well, with values for the various individual-specific factors and their respective coefficients being calculated based on data for the particular species or breed.

DEFINITIONS bST—Bovine somatotropin (bST) is a natural protein produced in the pituitary glands of all bovines that helps adult animals produce milk. bST is also a supplement for dairy cows used to enhance milk production.

Dairy Records Processing Center (DRPC)—DRPC's are organizations that measure milk yield of cows, determine percent fat, percent protein, and other milk tests, and provide dairy herd and cow information management tools to participating dairy herds.

First test day ("first test")—The first test day is the day an animal's milk production is first tested in her current lactation. Dairy cows average about 19 days in milk at first test, but range from about 5 to 40 days in most cases.

Lactation—Refers to the period of time during which an animal lactates. A lactation begins after calving and ends when an animal is not milked any longer in preparation for calving again. Throughout the present application two lactations are referenced, an individual's "previous lactation" and the following or, "current lactation." The dry period during which an animal is not milked prior to calving is associated with the lactation just completed (or, previous lactation). A lactation for a dairy cow is generally about 300 to 360 days, or 10-12 months long.

Milk production (MP)—Milk production is the amount of milk an animal produces during a certain period of time ("time;" e.g., on her first test day, over 305 days of lactation, or the like), either in a current or previous lactation, and is generally expressed in units of pounds, though equivalent weight units such as kilograms may be used.

MP_actual,time—MP_actual,time is the amount of milk an animal actually produces or is projected to produce in a certain period of time ("time"). The period of time may be the first test day ("first-test"), the first 305-days of a lactation period ("305") either in her current or previous lactation, or other periods of time (e.g., daily amount, weekly average or the like). The term "actual" is applied, because (a) if the time period is the first test day, the amount of milk produced by the animal is weighed and so reflects the actual amount of milk the animal produced; or, (b) if the time period is the first 305 days of the current time period (or another time period), the amount of milk the animal will produce during the first 305 days (or other time period) of the current lactation is projected based on the actual first test day amount from (a). For example, MP_actual,first-test is the amount of milk an animal actually produced on her first test day of the current lactation provided in units of lbs./day, kilograms/day or similar weight/time equivalents (e.g., a typical dairy cow value might be 80 lbs/day (36 kilograms/day)). MP_actual,305 is the amount of milk an animal is projected to produce in a 305-day period of her current lactation based on the amount of milk she actually produced on her first test day (MP_actual,first-test), and other data, and is provided in units of lbs. in 305 days, kilograms in 305 days, or similar weight/time equivalents (e.g., a typical dairy cow value might be 20,000 lbs. in 305 days (9,090 kilograms in 305 days)). Similarly, MP_actual,305,previous is the total amount of milk produced by an animal during the first 305 days of her previous lactation and reflects the individual's past performance. Values for the various MP_actual,time amounts are typically provided by a DRPC or other source. Ideally MP_actual,305 calculations use only individual—specific factors which do not confound the results by introducing herd-level effects, though this may vary by provider. For example, the herd production level adjustment that is sometimes applied to 305-day projections for an animal through the first 155 days of each lactation may be removed from the projection to eliminate a herd-level effect from the calculation.

MP_expected,time—MP_expected,time is the amount of milk an animal is expected to produce during a period of time ("time") in her current lactation based on her past performance and current state. For example, MP_expected,first-test is the amount of milk an animal is expected to produce on her first test day based on her performance in the previous lactation (i.e., MP_actual,305,previous) and on her current state. Likewise, MP_expected,305 is the amount of milk an animal is expected to produce over the first 305-day period of her current lactation based on her past performance and current state. MP_expected,time values are calculated according to the equations disclosed in the present invention. Units are similar to those described above for MP_actual,time.

Software, Parlor—Referring to milking parlors with meters to measure milk yield of individual cows, parlor software is non-DRPC milk recording software used by some herd managers to collect and manage their own herd data. Parlor software is generally provided by milking equipment manufacturers.

Software, Dairy Management—Dairy management software is dairy herd management software that may use milk yield data retrieved from DRPC records centers or from parlor software systems.

Transition monitor (TM)—A transition monitor is a monitor of transition programs for individual cows or herds of cows. The transition monitor combines the use of objective factors with individual cow-specific calculations [including a prediction of the individual's future performance (i.e., MP_expected,time values) based on her past performance and current state] to provide an unbiased quantifiable measure of fresh cow health and performance usable for both within and between herd comparisons for optimizing health and performance of the individuals and herd. Transition monitor values are based on comparisons between actual and expected milk production amounts for similar time periods ("time"). For example, if the actual and expected milk production values are for the first test day time period, the individual transition monitor values will likewise be for the first test day time period (TM_ind,first-test). Likewise the transition monitor value will be for the first 305-day time period (TM_ind,305) if the actual and expected milk production values used are similarly for the first 305-day period, and so on. Likewise for TM_herd,time calculations.

Transition period—The transition period generally refers to the period of time between the end of an animal's previous lactation (i.e., the beginning of the non-lactating or dry period before calving) and about 40 days after the cow calves. The period generally includes the last 20 to 30 days of the dry or non-lactating period through the first 40 days after the calving date. The transition period is typically a high-risk period of time for dairy cows because up to 80% of all dairy cow disease events occur within this period.

Transition programs—Transition programs are management programs designed to improve overall well-being of cows, to increase milk production, and to reduce the risk of disease (both metabolic and infectious in nature) in the period after calving. Components of transition programs include specific diets to prepare cows for high production, special nutritional additives to prevent metabolic disease, vaccinations to prevent infectious disease, and a multitude of management strategies to minimize social stresses on the cow as she completes her pregnancy and begins her lactation. Transition programs can have a substantial impact on whether or not, or to what extent, newly freshened cows (i.e., cows that have just calved) have disease problems. Good transition programs result in cows that freshen with few disease problems, whose milk production increases rapidly after calving and remains higher throughout lactation. Deficiencies in transition programs can cause such problems as milk fever, retained placenta, ketosis and displaced abomasums, mastitis, and result in reduced milk yield, altered milk components, and premature replacement or death. Accurate monitoring of the transition programs is therefore of great importance.

DETAILED DESCRIPTION

Method

Figure 1:
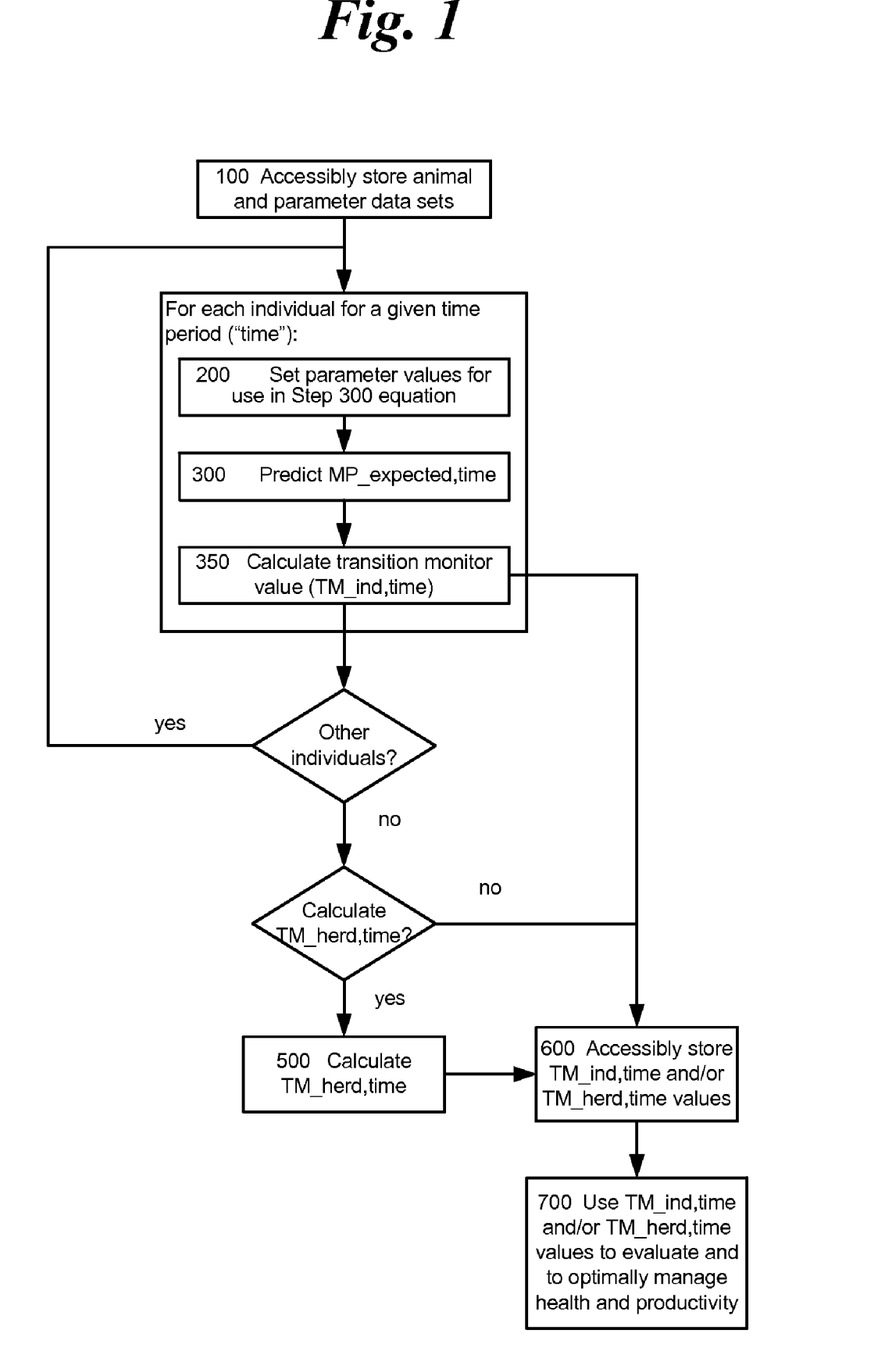
FIG. 1, shows a flow chart depicting basic steps in one version of the method of the present invention; and, FIG. 2, depicts the system of one version of the present invention.

The method of the present invention is a method of using a computer for calculating a transition monitor value for one or more milk-producing animals so as to enable its use in evaluating and optimally managing the health and productivity (i.e., the transition performance) of those individual cows and of their herds (see FIG. 1 for a flow chart depicting steps in one version of the method). It should be noted that, though the equations and tables of parameter values that follow are specifically directed to dairy cows, the basic methodology of calculating expected amounts of milk an individual will produce in a current lactation based on the individual's previous lactation and current state, calculating transition monitor values based on same and then using the transition monitor values for those same individuals to evaluate and to optimize their own and herd health and productivity, can be applied across species or breeds of milk producing mammals provided sufficient and appropriate data are available in the form of animal and parameters data sets (see Step 100 below).

Calculating a transition monitor value for each individual animal and given time period (i.e., TM_ind,time) using that individual's own data, effectively makes the animal her own control yielding a quantifiable measure of the individual's transition performance unbiased by herd effects and thereby greatly improved over traditional methods of monitoring fresh cow performance. The transition monitor values calculated by means of the present invention can then be used for evaluating an individual animal's transition performance and in making better informed transition program management decisions for optimizing the individual's health and productivity. Additionally, successive testing on different test days within an animal's current lactation may also potentially be used as an on-going monitor of the cow and to enable early detection of health problems.

Likewise, when transition monitor values are compiled for whole herds (i.e., TM_herd,time), herd-level management decisions and resulting health and productivity of the herd are optimized. By averaging the transition monitor values for all animals within a herd, herd managers can objectively compare the effectiveness of their transition cow management programs to industry benchmarks. Both within and between herd comparisons may be made. Likewise, the transition monitor values for a herd may be monitored over time in order to track ongoing fresh cow performance and evaluate the effectiveness of management changes that may be implemented with the transition animals.

Referring to FIG. 1, the basic steps in the method of the present invention are depicted. Though the method may be applied to single individual animals, it may generally also be used to evaluate the transition performance of a herd of animals (see Step 350 below).

Step 100—Accessibly store animal and parameter data sets. The following steps require that data be provided regarding each animal's current and past state (i.e., an animal data set 190) and also that data be provided regarding the values for the intercept, coefficients and factors used in the MP_expected,time calculations described at Step 300 below (i.e., a parameters data set 195) (see FIGS. 1 and 2). These data sets are then accessibly stored for use in the calculations described below at Steps 300 and 350.

The animal data set 190 consists of a variety of individual-specific data and is provided by a DRPC or other source with access to that information. The data may typically include: the amount of milk the animal produced in 305 days of her previous lactation (i.e., MP_actual,305,previous; this value reflects her past performance); the amount of milk she actually produced on her first test day of the current lactation (i.e., MP_actual,first-test); the amount of milk she is projected to produce in 305 days of her current lactation based on the MP_actual,first-test value (i.e., MP_actual,305) without herd production level adjustments; the number of days she had been milked when the first test was taken (i.e., the date of the test minus the calving date commencing the current lactation; CDIM, or current days in milk at the first test day); the number of days she was milked in her previous lactation (i.e., PDIM, or previous lactation days in milk); the current lactation starting code [CLS; i.e., whether or not lactation began following an abortion or following a normal calving of a lactation 2 or greater animal (i.e., whether it is the animal's first lactation); CLS is used to assign a value to factor CLSF at Step 200, see Table 1]; the month in which her current lactation calving occurred (CM; CM is used to assign a value to factor CMF at Step 200, see Table 1); her last test somatic cell count from the previous lactation expressed as a linear score (i.e., PLOG); the number of days she was not milked prior to the start of the current lactation (i.e., current calving date minus dry-off date; DDRY, or days dry); the previous lactation starting code factor (PLS; i.e., whether or not the prior lactation began following an abortion or a normal calving; if a normal calving, was it of a lactation 2 or greater or was it of a lactation 1 animal; PLS is used to assign a value to factor PLSF at Step 200, see Table 1); level of bST use in the herd during her previous lactation (BST; i.e., whether or not and at what rate bST was used; BST is used to assign a value to factor bSTF and bST305 at Step 200, see Table 1); her breed ("BRD"; BRD is used to assign a value to factor BRDF at Step 200, see Table 1); number of her previous lactation (PL; e.g., if her current lactation is her $5^{th}$, her previous lactation number would be 4, and so on; PL is used to assign a value to factor PLF at Step 200, see Table 1); her current lactation's milking frequency as of the test day (CLM; CLM is used to assign a value to factor CLMF at Step 200, see Table 1); her previous lactation's milking frequency (PLM; PLM is used to assign a value to factor PLMF at Step 200, see Table 1); identification of her sire; success of her previous lactation; and other relevant data. Please note that the variable designations used above are arbitrary (e.g., "PLS," "BST," "PL," etc.). They are simply used here as a means to more easily signify the particular type of animal data when referenced in the remainder of this description.

The parameters data set 195 consists of values for the intercept, coefficients and factors used in versions of the MP_expected,time equations described below (Step 300, Eqs. 1a-1d). These data are provided for use from a source such as the present inventors and are based on statistical analysis of data for animals in the relevant region of the country or world and on the time period for which the MP_expected,time values are calculated (e.g., whether for first test day, MP_expected,first-test; or for 305-day period, MP_expected,305). The present model, for example, was developed from Midwestern United States regional factors that would likely be different in the Southeastern or Southwestern regions of United States, as well as in other regions of the world. A sample of a parameters data set 195 is presented below (see Step 300 example section and Table 1) with values based on the first 305-day time period and Midwestern United States dairy cow data.

Parameter values are generally obtained by fitting a mixed effects model to dairy cow data (e.g., from the Midwestern United States in the present example). A random effect is fitted (using restricted maximum likelihood) corresponding to the categorical identifier for herd, and otherwise all effects are fitted as fixed effects (using generalized least squares based on the empirical covariance matrix including random effects). The fixed effects terms (see above under animal data set 190 for definitions): BST, BRD, PL, PLS, PLM, CLS, CM, and CLM, are fitted as categorical (classification) effects (and thus appropriately coded as indicator variables). All other fixed effects are fitted as continuous effects.

The particular values contained in the parameters data set 195 will also depend on whether the MP_expected,time amounts are being calculated based on first test day milk production values (i.e., MP_expected,first-test) or for 305-day milk production values (i.e., MP_expected,305). The parameters data set 195 will therefore vary depending on type of calculation (i.e., first-day or 305 day expected values) and on source of the animal data used for the statistical analyses (e.g., by region of world, etc.).

As will be evident to the reader, the regression equations for MP_expected,time may also require periodic re-computation with the arrival of new data and new developments in the dairy industry, and whenever milk production or other factors might be modified, in order to provide appropriate values for the intercept, coefficients and factors used to calculate expected first test and 305-day expected milk production values (i.e., MP_expected,first test and MP_expected, 305). For example, new formulations of bST might be introduced that could increase the persistency of high milk production later into the lactation, which would in turn result in changed relationships to the beginning of the subsequent lactation. Another example could be updates and modifications of the factors used by DRPC centers, or other data sources, to calculate MP_actual,305 values.

The parameters data set 195 may include values for the following intercept and coefficients used in the MP_expected, time calculations described below at Step 300 (Equations 1a-1d) including: $\alpha$, a regression coefficient intercept; $\beta$, a regression coefficient associated with MP_actual,305,previous; $\epsilon$, a regression coefficient associated with CDIM; $\gamma$=a regression coefficient associated with PDIM; $\delta$=a regression coefficient associated with PLOG; and, $\zeta$=a regression coefficient associated with DDRY.

Further, the parameters data set 195 includes sets of values for each factor. Each factor's actual value applied in each individual's calculation of MP_expected,time is set according to the related animal data for the individual (see Step 200 below). Factors may include: a factor whose value depends on the current lactation starting code (CLS; i.e., CLSF, or current lactation starting code factor); a factor whose value depends on the month in which the current lactation calving occurred (CM; i.e., CMF, or current lactation month factor); a factor whose value depends on the previous lactation starting code (PLS; i.e., PLSF, or previous lactation starting code factor); a bovine somatotropin factor whose value depends on whether or not and at what rate bST was used in the individual's previous lactation (BST; i.e., bSTF); a breed factor whose value depends on the breed of the individual (BRD; i.e., BRDF); a previous lactation factor whose value depends on the value of the previous lactation number (PL; i.e., PLF); a milking frequency factor whose value depends on the average number of times per day the individual is milked in the current lactation as of the test day (CLM; i.e., CLMF, or current lactation milking frequency factor); a multiplier whose value depends on the level of bST used individually if data are available, or in the herd generally (BST; i.e., bST305); and, a factor whose value depends on the previous lactation milking frequency (PLM; i.e., PLMF, or previous lactation milking frequency factor); among others.

Step 200—For each individual animal for a given time period, set parameter values for use in MP_expected,time calculations (Step 300). As discussed above, the parameters data set 195 includes sets of values for each factor. The particular factor values used in solving the equations at Step 300 are assigned based on various individual-specific conditions (i.e., conditions specified in the animal data set 190). In the present step, each factor's actual value applied in each individual's calculation of MP_expected,time is set according to the related animal data for the individual. For an example of values for various of the parameters and the conditions under which they are set, see Table 1 below. Values for the intercept and coefficients depend on the animal data used for the statistical analyses (described above at Step 100; e.g., region or origin, etc.) and on the type of MP_expected,time calculations being performed (e.g., time period is first-test, 305-day or some other time period).

Step 300—For each individual animal for a given time period, predict an expected value for the animal's milk production in the current lactation based on her past performance in the previous lactation and on her current state.

MP_expected,time is the amount of milk an animal is predicted to produce during a period of time in her current lactation. For example, MP_expected,first-test is the amount of milk the animal is expected to produce on her first test day of the current lactation (lbs. milk/day; kilograms of milk/ day). MP_expected,305 is the amount of milk the animal is expected to produce over the first 305-day period in her current lactation (lbs. milk in 305 days; kilograms of milk in 305 days).

The MP_expected,time values predict the animal's performance in the current lactation based upon the individual's prior history including her actual production in the previous lactation (MP_actual,305,previous; i.e., her previous performance) with adjustment for her current state as indicated by one or more of the individual's current lactation factor(s) (see parameters data set 195 for examples). The calculation uses individual-specific factors and is, therefore, free from confounding herd effects.

Please note that though the following equations are specifically for dairy cows, a similar approach may be applied to other types of milk producing animals such as other bovines or sheep and goats, provided sufficient data exist to develop the appropriate regression equations and solve for the various parameter values.

The equation to solve for MP_expected,time is the same whether it is employed to calculate MP_expected,first test or MP_expected,305. However, the values assigned to the various parameters (i.e., the intercept, coefficients and factors) will vary.

In its most basic form, MP_expected,time is calculated according to the following algorithm (see definitions of parameters at Step 100, parameters data set 195, above):

$$\text{MP\_expected,time} = \alpha + (\beta * \text{MP\_actual,305,previous}) + (\epsilon * \text{CDIM}) \quad \text{Eq. 1a}$$

Though equation 1a contains only two values (i.e., MP_actual,305,previous and CDIM), these two values provide a substantially accurate model for calculating the value for MP_expected,time. Additionally, Eq. 1a illustrates a basic innovation of the present invention, i.e., predicting an individual's expected milk production (MP_expected,time) based on her previous performance (MP_actual,305,prevous) and current state (as represented by CDIM).

The addition of other factors may further refine the model. For example, the following equation (Eq. 1b) adds 3 more values to further improve the model's accuracy (PDIM, CLSF and CMF):

$$\text{MP\_expected,time} = \alpha + (\beta * \text{MP\_actual,305,previous}) + (\epsilon * \text{CDIM}) + (\gamma * \text{PDIM}) + \text{CLSF} + \text{CMF} \quad \text{Eq. 1b}$$

Still further refinement of the model may be obtained by the addition of three more factors as follows in Eq. 1c:

$$\text{MP\_expected} = \alpha + (\beta * \text{MP\_actual,305,previous}) + (\epsilon * \text{CDIM}) + (\gamma * \text{PDIM}) + \text{CLSF} + \text{CMF} + (\delta * \text{PLOG}) + (\zeta * \text{DDRY}) + \text{PLSF} \quad \text{Eq. 1c}$$

Though all of the above equations 1a to 1c yield substantially accurate results, the following equation 1d contains still additional values to provide the most highly refined of the models:

$$\text{MP\_expected,time} = \alpha + (\beta * \text{MP\_actual,305,previous}) + (\epsilon * \text{CDIM}) + (\gamma * \text{PDIM}) + \text{CLSF} + \text{CMF} + (\delta * \text{PLOG}) + (\zeta * \text{DDRY}) + \text{PLSF} + \text{bSTF} + \text{BRDF} + \text{PLF} + \text{CLMF} + (\text{bST305} * \text{MP\_actual,305,previous}) + \text{PLMF} \quad \text{Eq. 1d}$$

Step 300 Example—Calculating MP_expected,305. The following is an example of the Step 100 calculation for the 305-day expected milk production, showing current values for the intercept, regression coefficients and factors (shown in the following table; as provided in the parameters data set 195) and as calculated using Eq. 1d. These are the best presently known values for the intercept, regression coefficients and factors for Eq. 1 d, for calculation of the MP_expected, 305. However, as mentioned previously, these values will be different for MP_expected,first-test calculations, for 305-day calculations, by region and when further information is acquired or updated. Also, for Eqs. 1a-1c, the coefficients will need solution as per normal statistical analysis (see above at Step 100).

$$\text{MP\_expected,305} = 3246.2 + (0.2941 * \text{MP\_actual,305,previous}) + (155.95 * \text{CDIM}) + (-3.7218 * \text{PDIM}) + \text{CLSF} + \text{CMF} + (-80.4888 * \text{PLOG}) + (3.8618 * \text{DDRY}) + \text{PL SF} + \text{bSTF} + \text{BRDF} + \text{PLF} + \text{CLMF} + (\text{bST305} * \text{MP\_actual,305,previous}) + \text{PLMF}$$

Eq. 1d' (i.e., Eq. 1d with sample coefficient values provided)

where the values for the various regression coefficients were calculated to equal, $\alpha = 3246.2;$ $\beta = 0.2941;$ $\gamma = -3.7218;$ $\delta = -80.4888;$ $\zeta = 3.8618;$ and, $\epsilon = 155.95;$ and where the individual-specific factors are assigned values according to the following (note that these values may vary with available data, by region or due to other factors; generally the values or information required to assign the values is retrieved from outside sources such as DRPCs or other providers):

TABLE 1

Values for factors used in example solution of Eq. 1d above (parameters data set 195 for 305-day time period and Midwestern regional dairy cow data). For each individual, values are set conditionally (see Step 200) according to the individual-specific criteria summarized in the present table and supplied from the animal data set 190.

| Factor | Value |
|---|---|
| bSTF | bovine somatotropin factor = <br> −1206.58 when BST data for the animal indicates that no bST was used in her prior lactation; <br> −265.4 when BST data for the animal indicates that bST was used in her prior lactation at a low rate; <br> 0 when BST data for the animal indicates that bST was used in her prior lactation at a medium rate; and, <br> 166.89 when BST data for the animal indicates that bST was used in her prior lactation at the Label rate. |
| BRDF | Breed factor = <br> −522.47 if BRD data indicates the animal is an Ayrshire (AY), Lineback (LD), Normandy (NM), or Simmental (SM); <br> −91.4430 if BRD data indicates the animal is a Brown Swiss (BS); <br> −670.42 if BRD data indicates the animal is a Guernsey (GU); <br> 885.99 if BRD data indicates the animal is a Holstein (HO); <br> −1476.83 if BRD data indicates the animal is a Jersey (JE); <br> 151.11 if BRD data indicates the animal is a Milking Shorthorn (MS), Blue & White (BW), Dutch Belted (DL), or, Red Dane (RD); <br> 967.50 if BRD data indicates the animal is a Red and White (WW) or Norwegian Red (NR); <br> 0 if BRD data indicates the animal is a Crossbreed (XX), Gelbvieh (GV) or Red Polled (RP) |
| PLF | previous lactation factor = <br> 1024.02 if PL data for the animal indicates that her previous lactation was her first; <br> 1503.92 if PL data for the animal indicates that her previous lactation was her second; <br> 1187.52 if PL data for the animal indicates that her previous lactation was her third; |

TABLE 1-continued

Values for factors used in example solution of Eq. 1d above (parameters data set 195 for 305-day time period and Midwestern regional dairy cow data). For each individual, values are set conditionally (see Step 200) according to the individual-specific criteria summarized in the present table and supplied from the animal data set 190.

| Factor | Value |
|---|---|
|  | 954.67 if PL data for the animal indicates that her previous lactation was her fourth; |
|  | 658.74 if PL data for the animal indicates that her previous lactation was her fifth; |
|  | 479.60 if PL data for the animal indicates that her previous lactation was her sixth; |
|  | 503.74 if PL data for the animal indicates that her previous lactation was her seventh; |
|  | 418.71 if PL data for the animal indicates that her previous lactation was her 8th; and, |
|  | 0 if PL data for the animal indicates that her previous lactation is her 9th or greater. |
| CLMF | Current lactation milking frequency factor (average milking frequencies are rounded to whole numbers) = |
|  | −2518.76 if CLM data for the animal indicates that her current lactation average milking frequency as of the test day is 2; |
|  | −1508.76 if CLM data for the animal indicates that her current lactation average milking frequency as of the test day is 3; |
|  | −656.91 if CLM data for the animal indicates that her current lactation average milking frequency as of the test day is 4; and, |
|  | 0 if CLM data for the animal indicates that her current lactation average milking frequency as of the test day is 5 or greater. |
| bST305 | multiplier whose value depends on the level of bST used = |
|  | 0.04711 when BST data for the animal indicates that no bST was used in her previous lactation; |
|  | 0.02165 when BST data for the animal indicates that bST was used in her previous lactation at a low rate; |
|  | 0 when BST data for the animal indicates that bST was used in her previous lactation at a medium rate; and, |
|  | −0.00886 when BST data for the animal indicates that bST was used in her previous lactation at the Label rate. |
| CLSF | Current lactation starting code factor = |
|  | 4753.73, if CLS data for the animal indicates that her calving was successful and the current lactation is not her first (i.e., lactation >1) |
|  | 0, if CLS data for the animal indicates that her calving was not successful (i.e., an abortion whether cow or heifer) |
| CMF | Month of the current lactation factor [note that this factor will vary by region of the country or world due to variations in weather and other conditions] = |
|  | 127.4 if CM data for the animal indicates she calved in January; |
|  | 259.09 if CM data for the animal indicates she calved in February; |
|  | 284.84 if CM data for the animal indicates she calved in March; |
|  | 268.76 if CM data for the animal indicates she calved in April |
|  | −7.3741 if CM data for the animal indicates she calved in May; |
|  | −718.41 if CM data for the animal indicates she calved in June; |
|  | −1163.21 if CM data for the animal indicates she calved in July; |
|  | −1167.97 if CM data for the animal indicates she calved in August; |
|  | −915.97 if CM data for the animal indicates she calved in September; |
|  | −488.84 if CM data for the animal indicates she calved in October; |
|  | −191.9 if CM data for the animal indicates she calved in November; and, |
|  | 0.0 if CM data for the animal indicates she calved in December |
| PLSF | Previous lactation starting code factor = |
|  | −1656.89, if PLS data for the animal indicates that her calving was successful and the lactation is not her first (i.e., lactation >1) |
|  | −676.14, if PLS data for the animal indicates that her calving was successful and the lactation is her first (i.e, the individual is a heifer, first lactation) |
|  | 0, if PLS data for the animal indicates that her calving was not successful (i.e., an abortion whether cow or heifer) |
| PLMF | Previous lactation milking frequency factor (note milking frequencies are rounded to whole numbers) |
|  | 2117.53 if PLM data for the animal indicates that her previous lactation milking frequency is 2; |
|  | 1415.65 if PLM data for the animal indicates that her previous lactation milking frequency is 3; and, |
|  | 0 if PLM data for the animal indicates that her previous lactation milking frequency is 4 or greater. |

Step 350—For Each Individual Animal for a Given Time Period, Calculate a Transition Monitor Value (TM_ind,time) as the Difference Between the Expected and Actual Values for Her Milk Production.

The transition monitor value for an individual animal (TM_ind,time), is calculated as the difference between the expected (MP_expected,time) and actual (MP_actual,time) values for milk production in the animal's current lactation for a given time period ("time"). Values for expected amounts of milk production for different time periods (i.e., MP_expected,first-test, or MP_expected,305) are calculated according to the equations disclosed above. Values for actual amounts of milk produced by an individual animal are provided by DRPC centers or other sources, whether for the first test day (MP_actual,first-test) or for the projected 305-day milk production, without the standard herd production level adjustment if less than 155 days in milk, (MP_actual,305) in the current lactation.

The basic equation for the calculation of an individual's transition monitor value is, $$TM\_ind,time = MP\_actual,time - MP\_expected,time \qquad \text{Eq. 2}$$

where,

MP_actual,time—is the actual milk production by the individual for a particular time period [e.g., when the time period is the first-test day, MP_actual,first-test is the actual amount of milk the individual produced on that day; when the time period is 305 days (i.e., MP_actual,305), "actual" milk production refers to the fact that though the value is a projected value for milk production during the first 305 days of the individual's current lactation, it is based on her actual milk production at first test day (MP_actual,first-test)]. This value is generally provided by DRPC centers or other sources; and, MP_expected,time—is the expected milk production by the individual for a particular time period and is calculated as described above in Step 300.

Since MP_actual,time and MP_expected,time values may relate to either the individual's milk production on her first test day or to her milk production over 305 days of her current lactation, the transition monitor may likewise vary accordingly. In other words, the transition monitor values may be calculated based on first test day values (i.e., TM_ind,first-test, using MP_actual,first-test and MP_expected,first-test values), or based on 305-day milk production values (i.e., TM_ind,305, based on MP_actual,305 and MP_expected, 305 values). Though the order of magnitude of the transition monitor value will vary depending on which types of MP values are used in its calculation [e.g., a TM_ind,first-test value may be on the order of 20 lbs/day (9.1 kilograms/day) versus a TM_ind,305 value which may be on the order of 3,000 lbs. in 305 days (1,363 kilograms in 305 days)], the relative results will nevertheless similarly indicate transition performance of the animal. Positive values will indicate better transition performance, negative values poorer transition performance.

A positive transition monitor value indicates that an individual exceeded expectations and has experienced a positive transition period. A negative transition monitor value indicates that she did not meet expected performance and has experienced a negative transition period. For example, if an animal's 305-day milk production is expected to be 20,000 pounds (9,090 kilograms) in the current lactation [i.e., MP_expected,305=20,000 lbs. (9,090 kilograms)], but her actual 305-day production is 22,000 pounds (10,000 kilograms) [i.e., MP_actual,305=22,000 lbs. (10,000 kilograms)], the transition monitor value (TM_ind,305)=22,000−20,000=+2,000 lbs. (+909 kilograms). A positive value means the transition program is working well for this particular animal since she is actually producing better than predicted. By contrast, if the transition monitor value is negative, this indicates some problem with the transition program relating to this animal because she did poorer than predicted.

Step 500—Calculate a Herd-Level Transition Monitor Value

The transition monitor value for a herd may be calculated by summing TM_ind,time values over all individuals in the herd and dividing by the number of individuals.

$$\text{TM\_herd, time} = \sum_{i=1}^{n} \text{TM\_ind, time}/n \qquad \text{Eq. 3}$$

where TM values are summed over all individuals i from i=1 to n (n=total number of individuals in the herd).

As with TM_ind,time values, TM_herd,time values are based on data for a particular time period (e.g., first test day or 305-day period in current lactation) For this reason, TM_herd,time values will vary relative to the time period. So long as comparisons of TM_herd values within and between herds are made for similar time periods, they will be comparable.

Step 600—Accessibly store TM_ind and/or TM_herd results. Results from any of the calculations described at Steps 300 and 350 above, may be accessibly stored in a results database 690 (see FIG. 2) for retrieval and use in subsequent analyses and presentations, etc. These results are then available for use by herd managers and the like to evaluate and optimally manage the health and productivity of individual animals and of herds of animals (see Step 700 below). The results are accessible to end users 780 for use in various types of analyses, presentations and the like.

Step 700—Use Transition Monitor Value Results to Evaluate and to Optimally Manage Health and Productivity of Individuals and/or Herds.

The transition monitor values for individual animals (TM_ind,time) and for herds of animals (TM_herd,time) may be used by dairy herd managers to evaluate and manage the health and productivity of those individuals and herds. By evaluating the results to determine if the productivity of individual animals and/or a herd is improving or not, managers can objectively evaluate whether or not their transition program practices are optimizing their health and productivity. If not, changes can be made to those management practices, and the present invention's methodology re-employed to evaluate whether those changes are improving health and productivity or not.

Within and between herd comparisons. Because the transition monitor values are objective measures, they may be used to compare within herd management practices such as differences between the transition programs applied to different individuals within the herd, differences in practices employed during different periods of time, and so on. Likewise, transition monitor values may be compared between herds to determine if practices applied to one herd are more or less optimal than those applied to another.

Informing breeding programs to improve herd genetics. In addition to within or between herd evaluations, other uses may also be made of the transition monitor values. For example, the individual transition monitor values may be used to identify sires with the genetic tendency to father offspring with good health and productivity during transition periods which, together with the transition monitor values for individual animals, may be used to inform breeding programs in order to further improve the genetic health and productivity of herds.

To accomplish this, the animal data set 190 (see step 100 above) may further include an identity of each animal's sire. The transition monitor values for individual animals may then also be associated with the animal's sire. An average TM value for each sire (e.g., TM_sire,time) may then be calculated as an average of transition monitor values over all the sire's daughters.

$$\text{TM\_sire, time} = \sum_{i=1}^{n} \text{TM\_ind, time}/n \qquad \text{Eq. 4}$$

where transition monitor values are summed over all daughters of a particular sire i from i=1 to n (n=total number of daughters of the sire for which transition monitor values are available). As with the other transition monitor values, the TM_sire calculations are for particular periods of time to be comparable between sires.

As will be evident to the reader, these TM_sire,time values may be tracked to evaluate the genetic tendency of a sire to produce offspring of greater or lesser levels of health and productivity, particularly during the early phase of current lactations. Knowing the genetic tendencies of various sires may better inform herd breeding programs. Herd managers may, for example, select sires with higher positive TM_sire, time values to improve progeny of an animal whose transition monitor values are low.

Early identification of sick animals. Another use of the above transition monitor values may be to calculate them on a daily basis in parlor software linked to milking parlors with daily milk weights. If done on a daily basis in the first weeks after calving, transition monitor values could assist herdsmen to identify sick animals at earlier stages of illness and improve response to treatment.

As the reader will undoubtedly see, the transition monitor values and methodologies described above can contribute in multiple ways to optimizing the health and productivity of individual animals and herds.

DETAILED DESCRIPTION

System

A general-purpose computer, its component devices, and software, provide means for implementing the method steps described above (see FIG. 2 for general system diagram).

Inputs databases 190 and 195 are provided (animal database and parameters database, respectively). Accessibly stored in the databases are the animal data set 190, the parameters data set 195 and any other data relevant to the calculations (see Step 100).

Figure 2:
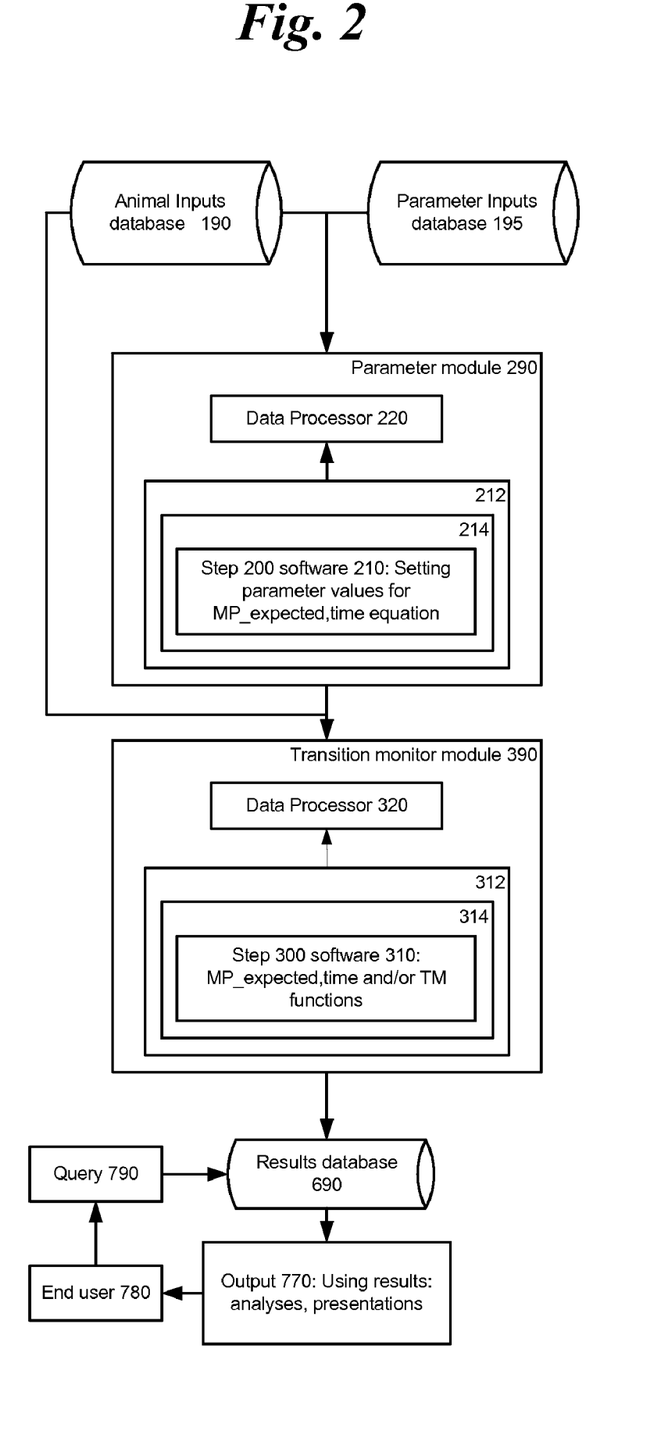

In a parameter module 290, individual-specific parameter values are set for use in solving the MP_expected,time function (see Step 300) according to step 200 above in conjunction with parameter software 210 and data processor 220. The parameter software 210 resides on a program storage device 212 having a computer usable medium 214 (e.g., diskette, CD, DAT tape, or the like) for storing the program code. The program storage device 212 may be of a conventional variety, such as a conventional disk or memory device. The parameter software 210 may be created using general-purpose application development tools such as programming languages, graphical design tools, and commercially available reusable software components. A general database engine may be used to manage data storage and retrieval. The processor 220 is part of a general-purpose computer system. Any general-purpose computer may be used, provided that the processing power is sufficient to achieve the desired speed of computation for the amount of data being processed by the system.

In a transition monitor module 390, the MP_expected,time function (i.e., equations 1a, 1b, 1c, and/or 1d) and the transition monitor functions (i.e., equations 2, 3, and/or 4) are solved according to steps 300-500 above in conjunction with transition monitor software 310 and data processor 320. The transition monitor software 310 resides on a program storage device 312 having a computer usable medium 314 (e.g., diskette, CD, DAT tape, or the like) for storing the program code. The program storage device 312 may be of a conventional variety, such as a conventional disk or memory device. The transition monitor software 310 may be created using general-purpose application development tools such as programming languages, graphical design tools, and commercially available reusable software components. A general database engine may be used to manage data storage and retrieval. The processor 320 is part of a general-purpose computer system. Any general-purpose computer may be used, provided that the processing power is sufficient to achieve the desired speed of computation for the amount of data being processed by the system.

It should be noted that, though the parameters module 290 and transition monitor module 390 may be provided separately as described above, they, and their component parts, may alternatively be combined. That is, the modules (290 and 390) may be provided as combined into a single module in which the respective software (210 and 310) is fully integrated and shares a single program storage device and data processor.

Once the transition monitor value results are accessibly stored in a results database 690 (see Step 600), they may be used in evaluating the condition of individuals and herds and in optimally managing their health and productivity. The results database 690 may be queried by an end user 780 who can request specific information from the system through a query 790 and thereby produce customized output 770. The system accommodates post-processing of the output data 770, allowing delivery in various formats and through various electronic media. The system can generate output 770 in the form of further analyses and presentations as graphs, spreadsheets, maps, HTML documents, or other formats. Queries 790 may be formulated to a user's specifications in order to create customized output to use in evaluations and in making management decisions. The output 770 can be delivered electronically through a variety of channels, including facsimile, e-mail, local area networks (LANs), wide area networks (WANs) and the worldwide web. It can also, of course, be provided in hard copy.

The results database 690 itself, or customized output data 770, may be incorporated into a dairy industry's information management system for intra-net online access (via a LAN or WAN) to enable industry-wide access to results such as herd transition monitor (TM_herd,time) or sire-specific transition monitor values (TM_sire,time) and the like. In this way, the system of the present invention may be fully incorporated into a dairy's information system to provide a seamless interface to their current individual and herd management structure.

CLOSING

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of using a computer for calculating a transition monitor value for a milk-producing animal at a given time period in a current lactation so as to enable its use in evaluating and optimally managing a health and a productivity of the milk-producing animal, the method comprising using said computer to perform the following steps:
    a) accessibly storing an animal data set comprising an amount of milk produced in a previous lactation period, a current number of days in milk at a test day, and an actual amount of milk produced in a current lactation period;
    b) accessibly storing a parameters data set comprising a regression coefficient intercept, a regression coefficient associated with the amount of milk produced in the previous lactation period, and a regression coefficient associated with the current number of days in milk;
    c) calculating an expected amount of milk produced by the milk-producing animal in the current lactation period by summing the regression coefficient intercept, the regression coefficient associated with the amount of milk produced in the previous lactation period multiplied by the amount of milk produced in the previous lactation period and the regression coefficient associated with the current number of days in milk multiplied by the current number of days in milk;
    d) calculating a transition monitor value by subtracting the expected amount of milk produced from the actual amount of milk produced in the current lactation period;
    e) accessibly storing the transition monitor value for the milk-producing animal; and
    f) outputting the transition monitor value for use in evaluating and optimizing the health and the productivity of the milk-producing animal;
    whereby a method is provided for calculating the expected amount of milk the milk-producing animal will produce in the current lactation period based on actual performance of the milk-producing animal in the previous lactation period and on a current state for use in calculating the transition monitor value indicative of a transition performance of the milk producing animal and usable for evaluating and optimizing the health and productivity of the milk-producing animal.

2. The method of claim 1, wherein the transition monitor value is calculated for two or more milk-producing animals, said two or more milk-producing animals constituting a herd, the method further comprising the step of calculating a transition monitor value for the herd by summing the transition monitor value for each of the two or more milk-producing animals in the herd and dividing by the number of milk-producing animals in the herd.

3. The method of claim 1, wherein the transition monitor value is calculated for two or more milk-producing animals, the two or more milk-producing animals constituting a herd, and wherein, for each of the two or more milk-producing animals the animal data set further comprises an identity of a sire of each of the two or more milk-producing animals, and further comprising the step of calculating for each sire a transition monitor value indicative of an overall transition performance of the sire's daughters for use in informing breeding programs to improve transition performance of a herd of milk-producing animals, the transition monitor value for each sire being calculated by summing of the transition monitor value for each daughter divided by the total number of daughters.

4. The method of claim 1 wherein the step (a) of accessibly storing the animal data set further comprises storing a previous lactation days in milk, a current lactation starting code, and a month at which the milk-producing animal calved.

5. The method of claim 4, wherein the step (b) of accessibly storing the parameters data set further comprises storing a regression coefficient associated with the previous lactation days in milk, and a plurality of values for each of a current lactation starting code factor and a current lactation month factor, each of the plurality of values dependent on a current lactation starting code and a month at which the milk-producing animal calved, respectively.

6. The method of claim 5, further comprising a step of setting the values for the current lactation starting code factor and the current lactation month factor conditional on the current lactation starting code and the month at which the milk-producing animal calved, respectively.

7. The method of claim 6, wherein the step of calculating the expected amount of milk produced in step (c) further comprises summing the regression coefficient associated with the previous lactation days in milk multiplied by the previous lactation days in milk, summing the current lactation starting period factor and the current lactation month factor.

8. The method of claim 4, wherein the step (a) of accessibly storing the animal data set further comprises storing a last test somatic cell count from a previous lactation expressed as a linear score, a number of days dry, and a previous lactation starting code.

9. The method of claim 8, wherein the step (b) of accessibly storing the parameter data set further comprises storing a regression coefficient associated with the previous lactation days in milk, a regression coefficient associated with the previous lactation expressed as a linear score, a regression coefficient associated with the number of days dry, and a plurality of values for each of a current lactation starting code factor, a current lactation month factor, and a previous lactation starting code factor, each of the plurality of values dependent on a current lactation starting code, the month at which the milk-producing animal calved, and previous lactation starting code, respectively.

10. The method of claim 9, further comprising the step of setting the plurality of values for the current lactation starting code factor, the current lactation month factor, and the previous lactation starting code factor conditional on the current lactation starting code, the month at which the milk-producing animal calved, and previous lactation starting code respectively.

11. The method of claim 8, wherein the step of calculating the expected amount of milk further comprises summing the current lactation starting period factor, summing the current lactation month factor, summing the regression coefficient associated with the previous days in milk multiplied by the previous days in milk, the regression coefficient associated with the previous lactation expressed as a linear score multiplied by the previous lactation expressed as a linear score, summing the regression coefficient associated with the number of days dry multiplied by the number of days dry, and summing the previous lactation starting code factor.

12. The method of claim 8, wherein the step (a) of accessibly storing the animal data set further comprises storing an amount of bovine somatropin factor used in the previous lactation, a breed type of the milk-producing animal, a number of previous lactations of the milk-producing animal, a current lactation milking frequency at the test day, and a previous lactation milking frequency.

13. The method of claim 12, wherein the step (b) of accessibly storing the parameters data set further comprises storing a regression coefficient associated with the previous lactation days in milk, regression coefficient associated with the previous lactation expressed as a linear score, a regression coefficient associated with the number of days dry, a plurality of values for each of a current lactation starting code factor, a current lactation month factor, a previous lactation starting code factor, a bovine somatotropin factor, a breed factor, a previous lactation factor, a current lactation milking frequency factor, a multiplier dependent on a level of bovine somatropin use, and a previous lactation milking frequency factor; each of said plurality of values dependent on the current lactation starting code; the month at which the milk-producing animal calved, previous lactation starting code, the amount of bovine somatropin use in the previous lactation, breed type, number of the previous lactation of the milk-producing animal, current lactation milking frequency at the test day, and previous lactation milking frequency, respectively.

14. The method of claim 13, further comprising a step of setting the values for current lactation starting code factor, the current lactation month factor, the previous lactation starting code factor, the bovine somatotropin factor, the breed factor, the previous lactation factor, the current lactation milking frequency factor, the multiplier dependent on the level of bovine somatropin use, and the previous lactation milking frequency factor conditional on the/a current lactation starting code, the month at which the milk-producing animal calved, the previous lactation starting code, the amount of bovine somatropin use in the previous lactation, the breed type, the number of previous lactation of the milk producing animal, the current lactation milking frequency at the test day, and the previous lactation milking frequency values, respectively.

15. The method of claim 13, wherein the step (c) of calculating the expected amount of milk produced further comprises summing the regression coefficient associated with the previous lactation days in milk multiplied by the previous lactation days in milk, summing the current lactation starting code factor, summing the current lactation month factor, summing the regression coefficient associated with the previous lactation expressed as a linear score multiplied by the previous lactation expressed as a linear score, summing the regression coefficient associated with the number of days dry multiplied by the number of days dry, summing the previous lactation starting code factor, the bovine somatotropin factor, summing the breed factor, summing the previous lactation factor, summing the current lactation milking frequency factor, summing the multiplier dependent on level of bovine somatropin use multiplied by the amount of milk produced in the previous lactation, and summing the previous lactation milking frequency factor.

* * * * *